United States Patent [19]
Claesson et al.

[11] 3,866,504
[45] Feb. 18, 1975

[54] SAW BLADE

[75] Inventors: Tore Vilhelm Claesson; Johan Esbjorn Rojd, both of Sandviken, Sweden

[73] Assignee: Sandvik Aktiebolag, Sandviken, Sweden

[22] Filed: Jan. 14, 1974

[21] Appl. No.: 433,374

Related U.S. Application Data
[63] Continuation of Ser. No. 227,810, Feb. 22, 1972, abandoned.

[30] Foreign Application Priority Data
Feb. 26, 1971 Sweden.............................. 2447/71

[52] U.S. Cl....................... 83/852, 83/854, 83/833, 30/355
[51] Int. Cl............................................ B27b 33/02
[58] Field of Search ............ 83/833, 835, 852, 853, 83/854; 30/355

[56] References Cited
UNITED STATES PATENTS

| | | | |
|---|---|---|---|
| 1,666,987 | 4/1928 | Billingsley............................ | 83/854 |
| 2,849,037 | 8/1958 | Wright.................................. | 83/852 |
| 2,857,942 | 10/1958 | Mall...................................... | 83/833 |
| 2,862,533 | 12/1958 | Mall...................................... | 83/834 |
| 3,091,266 | 5/1963 | Nelson............................. | 83/852 X |

*Primary Examiner*—Donald R. Schran
*Attorney, Agent, or Firm*—Pierce, Scheffler & Parker

[57] ABSTRACT

In the saw blade of this invention, in which the cutting teeth alternate with depth gauge teeth, the teeth are integral with the body of the blade. The cutting teeth are allochirally offset and each cutting tooth has a substantially radially directed chip surface and a relatively slightly inclined clearance surface formed by the edge of the blade.

5 Claims, 4 Drawing Figures

SAW BLADE

This is a continuation, of application Ser. No. 227,810 filed Feb. 22, 1972, now abandoned.

The present invention relates to a saw blade which, besides cutter teeth, has depth gauge teeth for limiting the cutting depth of the cutter teeth.

Heretofore, in such saw blades the cutter teeth have had a shovel shape, but this has been found less suitable because of the great width of the kerf. Conventional triangular teeth have also been suggested, but they have the disadvantage that their height rapidly decreases and the depth gauge teeth must often be ground down in order to match the cutter teeth.

According to the present invention, we use teeth that are formed by setting in one piece with the saw blade body and which have a clearance surface formed by the edge surface of the blade and inclined by only a small angle. This means that the height of the tooth decreases relatively little when the tooth is sharpened, so that the depth gauge does not have to be ground down so often. Preferably, the teeth are integral with, and have the same thickness as, the body of the saw. It has been found suitable to use a saw blade of this type in circular form for a clearing saw (i.e., a saw for cutting bush and the like). The blade can also be used in straight form, as, for instance, for hand saws.

The invention will now be described in greater detail in the following, taken with the appended drawing, in which.

Figure 1:
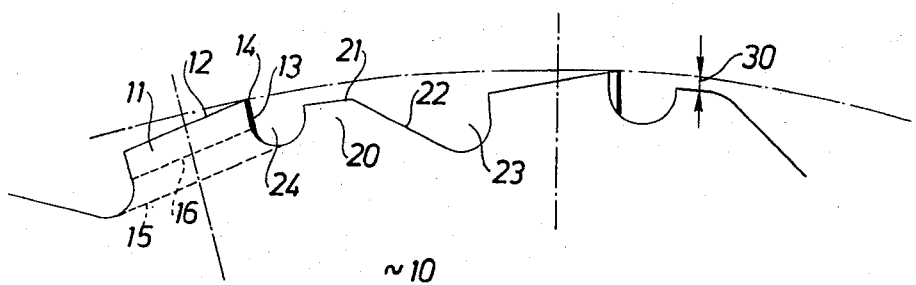
FIG. 1 is a side view of a circular saw blade according to the invention.

The saw blade 10 in FIG. 1 is circular. The teeth 11 have a clearance surface 12 with a rather small inclination, usually 10° to 20°, in relation to the tangent. The chip surface 13 has a radial, or substantially radial, direction with an inclination from the cutting edge 14 of from −5° forwardly to +30° rearwardly in relation to the radius. At the intersection of surfaces 12 and 13 there is formed a cutting edge 14. The teeth are formed in one piece (i.e., integrally) with the body of the blade, for instance by punching, and are set as shown in FIGS. 2 and 3.

Figure 2:
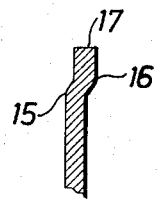
FIG. 2 is a section of a tooth on the blade on the line 2—2 of FIG. 3.

According to FIG. 2, the tooth is bent outwardly at a lower setting zone 15 and in the opposite direction at an upper setting zone 16, so that the section of the tooth in FIG. 2 obtains a stretched or extended S-shape.

Figure 3:
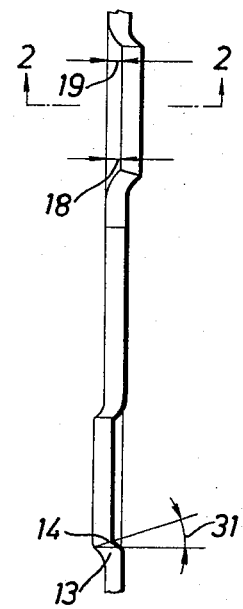
FIG. 3 is a view from the edge of the blade.

According to FIG. 3, the forepart of the tooth is offset somewhat more than is the rear part, the distance 18 thus becoming greater than the distance 19. The upper portion 17 of the teeth may, as shown in the section in FIG. 2, be somewhat inclined in relation to the body of the saw blade, for instance by about 2.5°.

The setting zone 16 desirably should be parallel with the clearance surface 12, in order that the tooth may maintain its setting when the chip surface 13 is moved rearwardly on the tooth by grinding for resharpening. In the illustrated case also the setting zone 15 is parallel with the clearance surface 12.

It should here be noted that it is possible to set the tooth at only one zone instead of two. This single zone should then be parallel with the clearance surface 12: it suitably is located somewhere within the lower half of the tooth.

As shown in FIG. 3, the chip surface 13 and consequently also the cutting edge 14 are inclined in relation to a plane containing the axis and form an angle 31 with this plane.

Between the cutting teeth there are depth gauges 20 having a tangentially directed top surface 21. Their fore surface 22 is directed forwardly - inwardly so that it acts as deflector for twigs, etc. The depth gauge is separated from the adjacent cutting teeth by gaps 23 and 24 which form chip spaces.

As an example of the dimensions of a circular clearing saw as shown in FIGS. 1 to 3 can be mentioned the following:

Diameter, 250 mm. Thickness, 1.6 mm. Tooth spacing, 15° = about 33 mm. The length of the teeth in the tangential direction, 11.8 mm. Clearance angle of surface 12 = 10°. The chip angle (= the direction of surface 13) is radial. The surface 22 is inclined 55° to the tangent. The depth of the chip spaces from the top side of the tooth is 5 mm. The setting 19 at the rear part of the tooth is 0.9 mm, and the setting 18 at the forepart of the tooth is 1.2 mm, the tooth diverging 1.5° sideways forwardly. The angle 31 of the chip surface with an axial plane is 20°. The setting is done by bending at the bottom and at the middle of the tooth, both setting lines being parallel with the clearance surface of the tooth. The depth 30 of the depth gauge = 0.9 mm.

Figure 4:
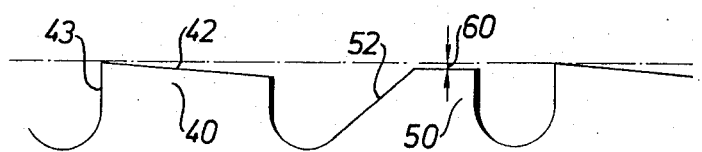
FIG. 4 illustrates a straight saw blade according to the invention.

Another embodiment of the invention is illustrated in FIG. 4, in the form of a straight hand saw blade. As an example of the dimensions there can be mentioned the following: Tooth spacing, 16 mm. Length of teeth 40 = 6 mm and height, 3 mm. Clearance of surface 42 = 5°. Chip surface 43 is radially directed. The fore surface 52 of the depth gauge 50 is inclined about 45°. The depth 60 of the depth gauge is 0.5 to 0.6 mm. The saw blade construction of the present invention has several advantages in comparison with conventional saw blades. The shape of the teeth eliminates the need of a resharpening machine, because the blade can be filed on the spot and without being removed from the machine. This means a substantial saving in transport and resharpening. The small clearance of the teeth means that the diameter during the life of a clearing saw diminishes only 3 mm while it can diminish about ten times more in a blade with triangular teeth. The depth gauges therefore seldom require adjustment grinding,- e.g., not more often than each fifth time the teeth are resharpened. The type of setting makes all resetting superfluous. The depth gauges promote a smooth cutting and lessen the risk for jerks of a rotary saw. If the saw cuts into stone, the diameter of the blade remains substantially unchanged and the blade can easily be resharpened.

We claim:

1. Saw blade adapted for cutting bush and tree branches, said blade having in combination alternating cutter teeth and depth gauge teeth which are spaced from each other at both ends, in which combination each cutter tooth is made in one piece with the body of the blade and formed by setting and has a substantially radially directed chip surface and a clearance surface formed by the edge of the blade and having a relatively small inclination to the sawing direction of up to 20°, said chip surface and clearance surface forming a cutting edge at their intersection, each depth gauge tooth being located at a short distance in front of the cutting edge and having an upper surface which is substantially parallel to a plane between the outermost points of the cutting teeth on either side of the depth gauge tooth, said cutting teeth being set along their whole length above said blade.

2. Saw blade adapted for cutting bush and tree branches, said blade having in combination alternating cutter teeth and depth gauge teeth which are spaced from each other at both ends, in which combination each cutter tooth is made in one piece with the body of the blade and formed by setting and has a substantially radially directed chip surface and a clearance surface formed by the edge of the blade and having a relatively small inclination to the sawing direction of up to 20°, said chip surface and clearance surface forming a cutting edge at their intersection, each depth gauge tooth being located at a short distance in front of the cutting edge and having an upper surface which is substantially parallel to a plane between the outermost points of the cutting teeth on either side of the depth gauge tooth and a fore surface which is directed forwardly inwardly to constitute a deflector for twigs.

3. Saw blade as defined in claim 1, in which each tooth is set at two zones to a stretched S-shape.

4. Saw blade as defined in claim 3, wherein the upper parts of the teeth are inclined somewhat outwardly in relation to the body of the saw blade.

5. Saw blade as defined in claim 1, in which the teeth are set along at least one zone that is parallel with the clearance surface.

* * * * *